Figure 1:
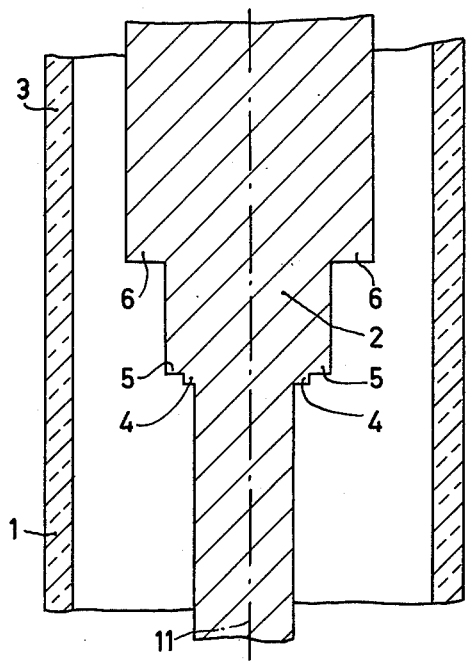

United States Patent [19]

Vrijssen et al.

[11] 4,304,586
[45] Dec. 8, 1981

[54] METHOD OF MANUFACTURING A CATHODE-RAY TUBE

[75] Inventors: Gerardus A. H. M. Vrijssen; Johannes H. T. van Roosmalen, both of Eindhoven, Netherlands

[73] Assignee: U.S. Philips Corporation, New York, N.Y.

[21] Appl. No.: 51,559

[22] Filed: Jun. 25, 1979

[30] Foreign Application Priority Data

Jul. 20, 1978 [NL] Netherlands ............... 7807756

[51] Int. Cl.³ .................................. C03B 23/08
[52] U.S. Cl. ............................ 65/109; 65/110; 65/277; 65/292; 220/2.1 A; 313/482
[58] Field of Search ............. 65/109, 110, 277, 292, 65/108; 220/2.1 A; 313/456, 482, 477, 402, 390, 383, 380

[56] References Cited

U.S. PATENT DOCUMENTS

| 2,661,437 | 12/1953 | Beckers | 220/2.1 A |
| 2,771,710 | 11/1956 | Molinari et al. | 65/277 X |
| 2,960,615 | 11/1960 | Harries | 313/482 X |
| 3,005,122 | 10/1961 | Coleman et al. | 220/2.1 A |
| 3,290,529 | 12/1966 | Kaseman | 313/482 X |
| 3,562,516 | 2/1971 | Guyot | 313/383 X |

Primary Examiner—Arthur D. Kellogg
Attorney, Agent, or Firm—Thomas A. Briody; Robert T. Mayer; Paul R. Miller

[57] ABSTRACT

A method of manufacturing a cathode-ray tube is provided by drawing a glass tube section softened by heating onto a mandrel whose transverse dimensions increase near one end of the tube section in the direction of the end at least twice in a generally stepwise manner, so that in the direction of the end, upon drawing, at least a first and a second wall portion of the inner wall of the tube section become located in planes substantially perpendicular to the tube axis. The first wall portion may serve as an engaging surface for an electrode and the second wall portion may serve as an engaging surface for the window. A third drawn wall portion may serve as a reference face of the tube in a device.

3 Claims, 11 Drawing Figures

METHOD OF MANUFACTURING A CATHODE-RAY TUBE

The present invention relates to a method of manufacturing a cathode-ray tube comprising a tubular envelope which is sealed at one end by a window having a target on its inside surface, in which envelope an electrode is provided in front of the target.

The present invention also relates to a cathode-ray tube manufactured according to this method.

Such cathode-ray tubes have a wide field of application and may be used, for example, as a display tube in a device for displaying colored television pictures. In that case the target is a display screen and the electrode is a color selection electrode, for example a shadow mask. Such cathode-ray tubes may also be used as picture pick-up tubes. In that case the target is a photoconductive layer and the electrode is a gauze electrode which ensures a satisfactory landing of the electron beam on the photoconductive layer.

Such a method as described in the opening paragraph is known from Netherlands Patent Application No. 7,307,168, corresponding to U.S. Pat. No. 3,912,851. This application describes a method in which a few apertures are made in the wall of an envelope and are sealed by means of plugs of indium or indium-containing material to which plugs a gauze electrode is sealed in the envelope at some distance from the window. A window closing the envelope is secured to a ground edge of the tubular part of the envelope by means of a indium sealing ring. This method of connecting the electrode and window is complicated and laborious and hence is not particularly suitable for use in mass production.

U.S. Pat. No. 2,938,134 discloses an electric discharge tube in which a number of electrodes are secured in an envelope. The envelope has a number of shoulders of different diameters against which the electrodes bear. The envelope has been obtained by treating a thick-walled glass vessel in such a manner that the shoulders are obtained. This method, too, is very laborious and not suitable for use in mass production.

It is the object of the invention to provide a method of manufacturing a cathode-ray tube in which accurately sized engaging surfaces for the electrode and the window are obtained in a very simple manner and in which it is possible in addition to simultaneously provide in one operation external reference faces for the axial and radial positions of the tube, which reference faces are related to the tube axis and the engaging surfaces.

The method according to the invention is characterized in that the envelope is obtained by sucking a glass tube portion softened by heating on to a mandrel the transverse dimensions of which mandrel near one end of the sucked tube portion increase to the end at least twice in a stepwise manner so that in the direction of the end, upon drawing, the inside surface of at least a first wall portion and a second wall portion of the glass tube portion become located in planes perpendicular to the tube axis, which first wall portion serves as an engaging surface for the electrode and which second wall portion serves as an engaging surface for the window. If desired, at least part of the envelope extending from the second wall portion to the end of the tube portion is removed.

The sucking on a mandrel of tubes softened by heating is known per se and is disclosed in Netherlands Patent Specification No. 911 and U.S. Pat. No. 2,531,394. The invention makes use of this.

It has proved possible by drawing on a mandrel to obtain in one operation not only calibrated tubes but in addition engaging surfaces in the tube which are disposed very accurately with respect to each other and to the tube axis.

If in the same operation as that in which the first and the second wall portions are formed a third wall portion is formed in the part of the tube portion extending between the second wall portion and the adjacent end of the tube portion with its inside surface transverse to the tube axis, at least a part of the third wall portion forms a reference face for axially locating the cathode-ray tube in an apparatus and at least a part of the portion of the inside surface of the sucked tube portion situated between the second and third wall portions forms a reference face for the radial position of the cathode-ray tube in an apparatus, for example positioning a television picture tube in a casing, or positioning projection device or a camera tube in an optical element (for example in a system of color-separating prisms contained in a camera).

In order to obtain such a reference face the part of the sucked tube portion extending from the third wall portion towards the adjacent end of the envelope should in many cases be removed. In order to be able to clean the window in a simple manner and to prevent accumulation of dust, the part of the sucked tube portion located between the second wall portion and the third wall portion is preferably provided with recesses continuing substantially up to the window.

Figure 2:
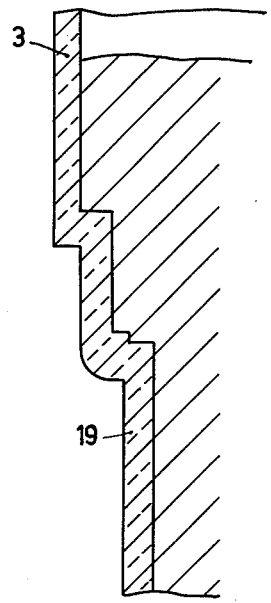
Figure 3:
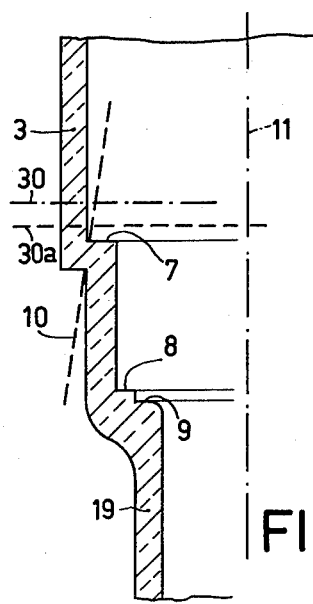
Figure 4A:
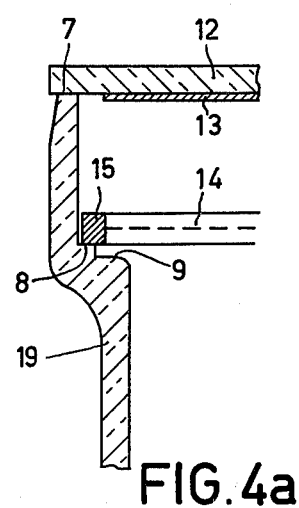
Figure 4B:
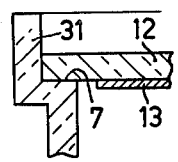
Figure 4C:
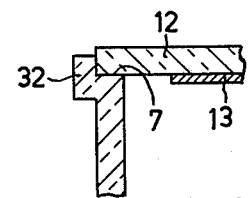
Figure 5:
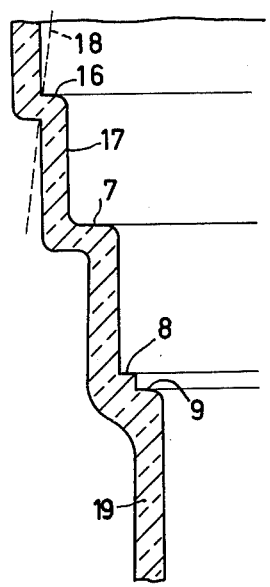
Figure 6:
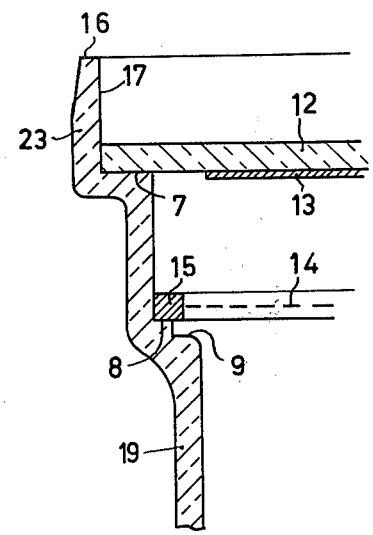
Figure 7:
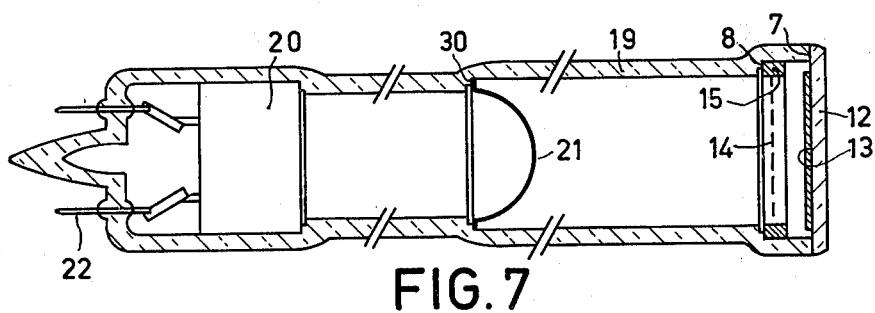
Figure 8:
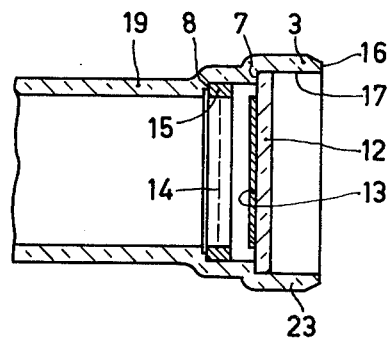
Figure 9:
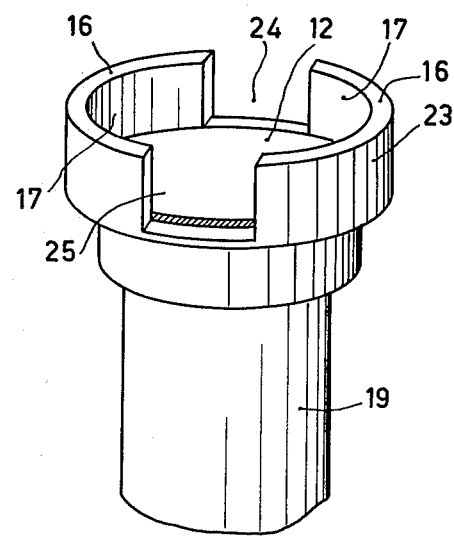

The invention will now be described in greater detail with reference to a drawing, in which FIG. 1 is a longitudinal section of a tube portion disposed around a stepped mandrel, FIG. 2 is a longitudinal section of part of a tube portion sucked on said mandrel formed from the tube portion shown in FIG. 1, FIGS. 3, 4a, 4b and 4c are longitudinal sections of parts of cathode ray tubes made by using sucked tube portions similar to that shown in FIG. 2, FIGS. 5 and 6 are longitudinal sections of a second embodiment of the invention, FIG. 7 is a schematic longitudinal section of a television camera tube made by a method according to the invention, FIG. 8 is a schematic longitudinal section of part of a second television camera tube made by a method according to the invention, and FIG. 9 is a schematic partly perspective view of a third embodiment of a part of a third television camera tube made by a method according to the invention.

FIG. 1 is a longitudinal section of a glass tube portion 1 having therein a metal mandrel 2. The diameter of the mandrel 2 increases stepwise three times in the direction towards an end 3 of the tube portion 1 with the mandrel 2 having shoulders 4, 5 and 6. The mandrel 2 may be a single body or may consist of two or more parts. After heating the glass tube portion 1 so that it softens, it is sucked against the mandrel as is shown in FIG. 2. Upon cooling, the mandrel will shrink more than the drawn portion 19 and the mandrel may be taken out to obtain the tube portion 19 as shown in FIG. 3. The inner surface of wall portions 7, 8 and 9 of the sucked tube portion 19 are very smooth and are situated accurately in planes transverse to the longitudinal axis 11 of the sucked tube portion 19. By cutting or sawing the end 3 of the tube portion 19 along the line 10, the inner surface 7 of a second wall portion (as defined above) may serve as an engaging surface for a window 12 bearing a photoconductive layer 13 as is shown in FIG. 4a. The inner surface 8 of a first wall portion (as defined above) may serve as an engaging surface for a ring 15 in which a grid electrode 14 is mounted. As a result of supporting this assembly on the wall portions 7 and 8 the grid electrode 14 is accurately parallel to the photoconductive layer 13. It is also possible, however, to cut or saw the tube portion 19 along the line 30 or 30a (FIG. 3) so that an edge 31 or 32 respectively centering the window remains around the wall portion 7 (see FIGS. 4b and 4c).

FIG. 5 also shows a sucked tube portion 19 having a third wall portion 16 extending transversely to the tube axis and obtained by sucking on a mandrel. By sawing or cutting the end 3 of the tube portion 19 along the line 18 an envelope is obtained as is shown partly in FIG. 6. The wall portion 16 and the portion 17 of the inside wall of the envelope are calibrated accurately with respect to the wall portions 7 and 8 and the tube axis and may serve as reference faces.

FIG. 7 is a longitudinal section of a television camera tube according to the invention. An electron gun 20 is provided in the glass envelope 19 which has been obtained by sucking on a mandrel by means of a method according to the invention. Nickel wall electrodes (not shown) are provided in known manner on the inside wall of the envelope 19. A window 12 bearing a photoconductive layer 13 and a ring 15 in which a grid electrode 14 is mounted are secured in the envelope 19, as is shown in FIG. 4a. The camera tube comprises moreover a diaphragm 21, which also bears against a drawn reference face. The camera tube has connection pins 22.

FIG. 8 is a second embodiment of a television camera tube according to the invention shown as a longitudinal sectional view of a part of the tube and corresponding to the shape described with reference to FIG. 6. Thus the reference numerals in FIG. 8 correspond to the reference numerals of FIG. 6.

In FIG. 8 the edge 23 projecting beyond the window 12 makes it very difficult to clean the window. In the embodiment shown in FIG. 9 therefore, the portion 23 projecting beyond the window is provided with two recesses 24 and 25 extending up to the window 12. The reference faces 16 and 17 remain for the purposes of locating the camera tube in an apparatus and for locating the window 12 in the camera tube respectively.

It will be obvious that the invention is not restricted to circular tubes but that it may also be used for angular, for example square tubes. It is possible, for example, by means of the method according to the invention to manufacture small color television display tubes in which the color selection electrode and the phosphor screen on the inside of the window are positioned very accurately with respect to each other.

What is claimed is:

1. A method of manufacturing a cathode-ray tube comprising a tubular glass envelope having one end sealed by a window bearing a target on an inside surface and an electrode disposed inside said envelope in front of said target, said method comprising the steps of softening a glass tube portion by heating, forming said envelope from said softened tube portion with a mandrel, said mandrel having transverse dimensions near one end that increase at least twice substantially in a stepwise manner, forming at least first and second wall portions at inside surfaces of said tube portion from said transverse dimensions of said mandrel, said first and second wall portions having planes transverse to the longitudinal tube axis of said tube portion, placing an electrode at said first wall portions which serve as engaging or supporting surfaces therefore, and inserting said window at said second wall portions.

2. A method as claimed in claim 1, wherein a part of said envelope extending from second wall portions is at least partially removed.

3. A method as claimed in claim 1 or 2, wherein a third wall portion of said inside surface of said tube portion is formed simultaneously with said first and second wall portions in a portion of said envelope extending from said second wall portion to the end in a plane transverse to said longitudinal tube axis, wherein at least a part of said third wall portion forms a reference face for the axial position of said cathode-ray tube, and wherein at least a part of said portion of said inside surface of said envelope situated between said second and third wall portions serves as a reference face for the radial position of said cathode-ray tube.

* * * * *